(12) United States Patent
Tomlinson

(10) Patent No.: US 12,515,448 B2
(45) Date of Patent: *Jan. 6, 2026

(54) POST CONSUMER WASTE THERMAL FACE SHEET

(71) Applicant: Brian Tomlinson, Pickering (CA)

(72) Inventor: Brian Tomlinson, Pickering (CA)

(73) Assignee: Brian Tomlinson, Havelock (CA)

( * ) Notice: Subject to any disclaimer, the term of this patent is extended or adjusted under 35 U.S.C. 154(b) by 17 days.

This patent is subject to a terminal disclaimer.

(21) Appl. No.: 18/603,907

(22) Filed: Mar. 13, 2024

(65) Prior Publication Data

US 2024/0208197 A1 Jun. 27, 2024

Related U.S. Application Data

(63) Continuation of application No. 17/891,833, filed on Aug. 19, 2022, now Pat. No. 11,958,278.

(60) Provisional application No. 63/236,760, filed on Aug. 25, 2021.

(51) Int. Cl.
*B32B 37/12* (2006.01)
*G09F 3/02* (2006.01)

(52) U.S. Cl.
CPC ............ *B32B 37/1284* (2013.01); *G09F 3/02* (2013.01); *G09F 2003/0201* (2013.01); *G09F 2003/023* (2013.01)

(58) Field of Classification Search
CPC .................. B32B 37/1284; G09F 3/02; G09F 2003/0201; G09F 2003/023; G09F 3/10; G09F 2003/0202; G09F 2003/0211; G09F 2003/0223; G09F 2003/0257
See application file for complete search history.

(56) References Cited

U.S. PATENT DOCUMENTS 11,958,278 B2 * 4/2024 Tomlinson .......... B32B 37/1284
2004/0202833 A1 10/2004 Anderson et al.
2007/0054117 A1 3/2007 Katchko et al.

FOREIGN PATENT DOCUMENTS

JP 2011056911 A 3/2011
JP 2015223809 A 12/2015

OTHER PUBLICATIONS

EPO; Extended European Search Report relating to EP application No. 22275114.4 dated Feb. 1, 2023.
USPTO; Office Action relating to U.S. Appl. No. 17/891,833 dated Aug. 17, 2023.
EPO; Communication Pursuant to Article 94(3) EPC relating to EP application No. 22275114.1 dated Nov. 15, 2024.

* cited by examiner

*Primary Examiner* — Patricia L. Nordmeyer
(74) *Attorney, Agent, or Firm* — Rowand LLP

(57) ABSTRACT

Label assemblies and methods of manufacturing label assemblies are described. In an aspect, a thermal sheet includes a post-consumer waste (PCW) paper layer and a thermal coating applied at a side of the post-consumer waste paper layer. The post-consumer waste paper layer may have a fiber density that allows the thermal coating to sit on the side of the post-consumer waste paper layer while reducing absorption of the thermal coating within the post-consumer waste paper layer.

18 Claims, 3 Drawing Sheets

POST CONSUMER WASTE THERMAL FACE SHEET

CROSS-REFERENCE TO RELATED APPLICATIONS

The present application is a continuation of U.S. application Ser. No. 17/891,833 filed Aug. 19, 2022 and claims the benefit of priority to U.S. application No. 63/236,760 filed Aug. 25, 2021. The contents of these prior applications are incorporated herein by reference.

FIELD

The present application relates to a label assembly and, more particularly, to a pressure-sensitive label having a face sheet made of post-consumer wastepaper coated with a thermal coating to allow direct thermal or thermal transfer printing.

BACKGROUND

Thermal labels are used with thermal printers to print variable information onto a surface. The two main types of thermal printing are direct thermal and thermal transfer. Direct thermal uses heat to image the surface. That is, direct thermal applies heat to the surface being marked. Direct thermal printing uses chemically treated, heat-sensitive media that blackens when passed under a thermal printhead. Thermal transfer uses a heated ribbon to transfer information onto the surface. Thermal pressure-sensitive labels are commonly applied to various products to identify information associated with the product. Such labels are used in numerous environments to provide a variety of functions including, for example, identifying the source or destination of goods, identifying a price associated with goods, identifying nutritional information associated with a food product, etc.

Typically, thermal pressure-sensitive labels include a top layer which is coated to allow it to be printed upon using a thermal printer. The top layer is coated with a direct thermal coating or a thermal transfer coating. The label often has an adhesive on the bottom side. That is, the label assembly may have an adhesive layer at a side of the top layer 102 that is opposite the side on which the thermal coating is applied. The label may not be used immediately following its manufacture and so, in some implementations, a release liner is placed on the other side of the adhesive to prevent the adhesive from unintentionally sticking to other items. The release liner is coated with a silicone release agent to allow the release liner to be easily removed from the adhesive when a user is ready to put the label to use. In some instances, the label may not have a liner and have silicone applied on top of the direct thermal coating making the label a liner-less label. Accordingly, a removable liner may contact the adhesive to sandwich the adhesive between the removable liner and the top layer 102.

Thermal labels may also include labels that do not have an adhesive. Thus, it is contemplated that a thermal label may include the top layer 102 described herein which is thermally coated as described herein but which does not include an adhesive or adhesive layer. For example, the thermal label may be a point-of-sale receipt. Thermal labels that do not include an adhesive may also be referred to as thermal paper.

Thermal pressure-sensitive labels are commonly manufactured using a smooth coated paper product. That is, the paper is processed to provide a smooth surface on at least one side of the paper. The thermal coating is then applied to the finished side of the paper that will form the thermal face sheet. The paper's smooth surface prevents the thermal coating from soaking into the fibers of the paper. That is, the smooth finish prevents the thermal coating from migrating into the paper itself and so the thermal coating forms a layer on top of the paper. Then, an adhesive is attached to the label using a transfer coating process. More particularly, the adhesive is applied to the silicone layer of the release liner. The release liner and the adhesive are then passed through a dryer which removes the water from the adhesive. The adhesive is then "transferred" to the back of the face sheet of the label itself. More particularly, the liner with the adhesive is laminated to the back of the face sheet by layering the face sheet on the exposed side of the adhesive. The face sheet is not treated with silicone and so the adhesive adheres better to the face sheet than the silicone-treated liner and the adhesive effectively migrates to the back of the face sheet. The adhesive may also be direct coated onto the back of the thermal face sheet.

Thermal labels have traditionally been made with virgin paper that is has a smooth surface to allow the coating to sit on the surface. Post-consumer waste (PCW) paper is an uncoated paper that is very porous and lets the coating sink into the paper leaving an uneven coating which affects imaging. For this reason, PCW paper has traditionally not been used for thermal label and, more generically, for thermal printing. With billions of labels being made each year, there has been a demand for a more environmentally friendly solution.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1:
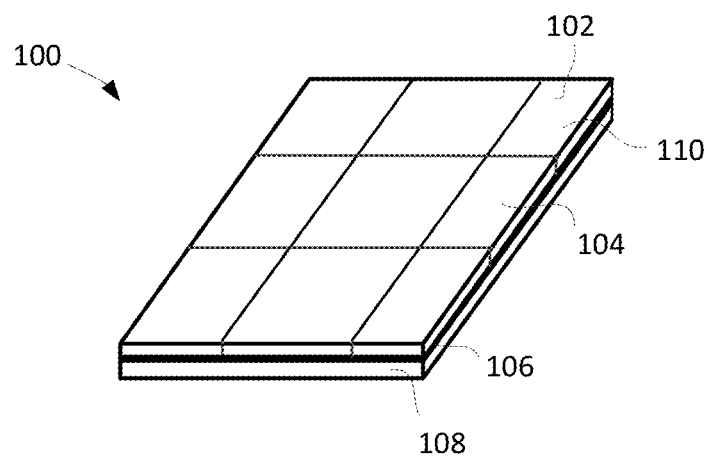
FIG. 1 shows a perspective view of a label assembly in accordance with example embodiments of the present disclosure.

In accordance with the present application, there is provided a label assembly. The label assembly may include a post-consumer waste (PCW) paper layer. The label assembly may include a thermal coating applied at a side of the post-consumer waste paper layer. The post-consumer waste paper layer may have a fiber density that allows the thermal coating to sit on the side of the post-consumer waste paper layer while reducing absorption of the thermal coating within the post-consumer waste paper layer.

In some implementations, the PCW paper layer may be an uncoated paper, the uncoated paper being a paper that is not coated during the manufacture of the paper.

In some implementations, the PCW layer may have a primer at the side of the PCW paper layer and wherein the primer is beneath the thermal coating.

In some implementations, the label assembly may include an adhesive layer at a side of the PCW paper layer that is opposite the side on which the thermal coating is applied.

In some implementations, the label assembly may include a removable liner contacting the adhesive. The removable liner may sandwich the adhesive between the removable liner and the PCW paper layer.

In some implementations, the PCW paper layer may have a Sheffield smoothness rating that is less than 170 Sheffield units on a felt side of the PCW paper layer and less than 190 Sheffield units at a wire side of the PCW paper layer.

In some implementations, the PCW paper layer may have a Gurley porosity that is greater than 13 seconds per 100 cubic centimeters.

In some implementations, the PCW paper layer may include at least 70% PCW.

In another aspect, a method is described. The method may include: providing a post-consumer waste (PCW) paper layer; and applying a thermal coating at a side of the PCW paper layer, wherein the PCW paper layer has a fiber density that allows the thermal coating to sit on the side of the post-consumer waste paper layer while reducing absorption of the thermal coating within the post-consumer waste paper layer.

In some implementations, the PCW paper layer may be an uncoated paper. The uncoated paper may be a paper that is not coated during the manufacture of the paper.

In some implementations, the method may include, prior to applying the thermal coating, applying a primer at the side of the PCW paper layer.

In some implementations, the method may include applying an adhesive layer at a side of the PCW paper layer that is opposite the side on which the thermal coating is applied.

In some implementations, the method 500 may include applying a removable liner contacting the adhesive to sandwich the adhesive between the removable liner and the PCW paper layer.

In some implementations, the PCW paper layer may have a Sheffield smoothness rating that is less than 170 Sheffield units on a felt side of the PCW paper layer and less than 190 Sheffield units at a wire side of the PCW paper layer.

In some implementations, the PCW paper layer may have a Gurley porosity that is greater than 13 seconds per 100 cubic centimeters.

In some implementations, the PCW paper layer may include at least 70% PCW.

Figure 2:
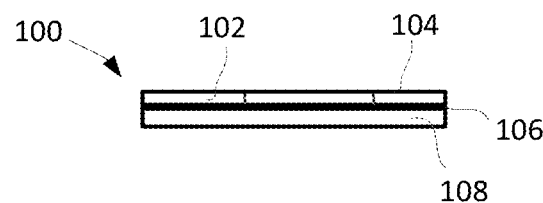
FIG. 2 shows a side view of the label assembly of FIG. 1.

Reference is first made to FIG. 1 and FIG. 2. FIG. 1 shows a perspective view of a label assembly 100 and FIG. 2 shows a side view of the label assembly 100. The label assembly 100 includes a plurality of pressure sensitive labels 110. The label assembly 100 includes a top layer 102. In the example illustrated, the top layer 102 is a label sheet which includes a plurality of pressure-sensitive label regions, each associated with a separate label 110. More particularly, the example label sheet includes nine label regions, each associated with a separate label 110. The number of labels provided on the label sheet may, however, be different in other embodiments.

The top layer 102 has a front side 104 and a back side opposite the front side. The front side 104 may be configured for receiving a printed layer, such as ink. Accordingly, the front side of the top layer 102 may include indicia printed thereon. Such indicia may be, for example, a graphic or text, which may be printed using ink. For example, in some embodiments, a logo may be printed on the label. In some embodiments, pricing information, nutritional information (e.g., associated with a food product), shipping information (such as a recipient or sender's address), or other information may be printed on the front side 104 of the top layer 102. The back side, which is not shown in FIG. 1 or FIG. 2, is parallel to the front side. The printing may be thermal printing. That is, the printing may be applied by passing the top layer 102 through a digital printing process which produces a printed image by passing the thermal coated paper through a thermal printer.

The label assembly 100 may, in at least some embodiments, be distributed as a blank label. That is, in some embodiments, the top layer 102 may not have indicia printed thereon when the label is distributed; the top layer 102 may be printed on or written on after manufacture (e.g. by an end user). The top layer 102 may also be referred to as a face sheet.

The top layer 102 is paper-based and may, for example, have a paper density between thirty and one hundred and fifty grams per square meter (GSM). In an example embodiment, the top layer 102 is constructed of 60 GSM paper. In an embodiment, the top layer 102 is uncoated paper made with post-consumer waste. For example, the top layer 102 may be uncoated paper. The top layer 102 may be made with 70 percent or more post-consumer waste (PCW). The top layer 102 is also coated with a thermal coating. That is, a thermal coating is applied at a top side of the top layer 102.

Since the top layer is constructed of post-consumer waste paper, it may also be referred to as a post-consumer waste (PCW) paper layer.

The label assembly 100 illustrated in FIGS. 1 and 2 also includes an adhesive 106. In some embodiments, the adhesive is a permanent adhesive. The permanent adhesive allows for the label to be applied to various surfaces. For example, in some embodiments the adhesive is one that will provide a peel adhesion of between 80 and 2400 grams if it were applied directly onto a 1 millimeter thickness polyester film and when tested on #304 stainless steel.

The adhesive may, in other embodiments, be of another type. For example, the adhesive may be a repositionable adhesive or a removable adhesive.

The adhesive may be applied to the back side of the top layer 102. In at least some embodiments, the adhesive 106 covers the entirety of the back side of the top layer 102. In at least some embodiments, the adhesive is applied to the back side of the top layer 102. In an embodiment, each label 110 that is provided by the top layer 102 has a back side that is entirely coated by the adhesive such that all portions of the back side are sticky. That is, the back side of each label region of the top layer directly contacts the adhesive 106.

In other example embodiments, the adhesive may not coat the entirety of the back side of the top layer 102. Instead, the adhesive may only coat a portion of the back side of the top layer 102; for example, the back side may be pattern coated, in some embodiments.

The label assembly of FIGS. 1 and 2 also includes a release liner 108, which will generally be referred to as a liner 108 or a silicone-treated liner herein. The liner 108 directly contacts the adhesive 106 at a side of the adhesive that is opposite the side that contacts the top layer 102. The liner contacts the entirety of a side of the adhesive. Accordingly, the liner 108 effectively sandwiches the adhesive between the top layer and the liner; the adhesive acts as a middle layer and the liner 108 acts as a bottom layer. The adhesive 106 and the liner 108 are the only two layers that are below the top layer 102; the adhesive 106 is the only layer between the liner 108 and the top layer 102.

In some embodiments, the label may not have a liner 108. Instead, the label may be used as a linerless label. In some implementations of a linerless label, the label assembly may be provided in roll form. In this way, the top layer may act as both a liner and a face layer. In at least some such implementations, a face side of the top layer (which is the side that does not have the adhesive) may be coated with a release substance, such as silicone.

Similarly, in implementations that include a liner, the liner 108 includes silicone to impart release from the adhesive 106. The silicone is applied to the side of the liner that is to contact the adhesive 106.

The liner 108 can be constructed of paper or film to allow the liner 108 to be removed without tearing. In at least some embodiments, the liner is constructed of a paper having a paper density greater between 30 and 150 grams per square meter. In one embodiment, 75 GSM paper is used.

In at least some embodiments, unlike a traditional thermal face, the paper used for the top layer 102 is not virgin paper. The paper used for the top layer 102 may be PCW paper. The paper used for the top layer 102 may be an uncoated paper. As used herein, uncoated paper is paper that is not coated during a manufacturing process of the paper itself. The paper used for the top layer 102 may not have a machine finish at a side of the paper on which the thermal coating is applied. The paper used for the top layer 102 may not be supercalendered on a side of the paper on which the thermal coating is applied. The paper used for the top layer 102 may not have a gloss finish at a side of the paper on which the thermal coating is applied.

More specifically, traditional thermal face paper is coated or has a gloss finish on the side of the paper that a thermal coating is applied during manufacture of the paper to so that the thermal coating does not penetrate the paper but rather rests on the surface of the paper. In contrast, the face paper of the present application (i.e., the paper that forms the top layer 102) uses uncoated paper. That is, the surface of the paper at which the thermal coating is applied in the present application may be a side that has been finished. That is, the thermal coating is applied at a surface of the top layer 102 which has not been super calendared finished or coated. In some embodiments, the paper may be an otherwise (i.e., apart from the thermal coating and the adhesive) uncoated paper. By way of example, the paper may be uncoated paper. Bond paper is a high-quality durable writing paper that is similar to bank paper but has a weight greater than 30 g/m2. In at least some implementations, the paper used in the top layer has a dense sheet structure that improves the thermal hold-out of the sheet. This also allows the paper to be a reduced thickness paper. The top layer 102 may be 100% PCW uncoated paper that is a denser than standard bond paper which causes it to be smoother than a standard 100% PCW bond paper. This is demonstrated by the Sheffield Smoothness test results illustrated below. This allows the thermal coating to not soak into the paper. The Porosity Gurley test also indicates the significant increase in the density of the paper; while being thinner, it takes much longer for the air to pass through the paper, once again allowing the thermal coating to remain.

| Properties | | Units | Test Method | Face Sheet of Present application | Standard 100% PCW BOND |
|---|---|---|---|---|---|
| Basis weight | | lb - 17 × 22M | TAPPI T410 | 32 | 40 |
| Basis weight | | g/m² | TAPPI T410 | 60 | 75.2 |
| Thickness | | mils | TAPPI T411 | 2.6 | 4 |
| Smoothness Sheffield | FS | SU | TAPPI T538 | 75 | 170 |
| | WS | WS | | 75 | 190 |
| Tensile | MD | lb/in | TAPPI T494 | 25 | 50 |
| | CD | | | 15 | 55 |
| Porosity Gurley | | sec./100 cc | TAPPI T460 | 90 | 13 |
| Opacity | | % | TAPPI T519 | 80 | 89 |

Wherein MD is Machine Direction. CD is Cross Direction, FS is felt side (top of paper), WS is wire side (base of paper).

Sheffield Smoothness is an air leak smoothness test that responds to relatively large surface imperfections or undulations. A smoother, more level surface results in a lower Sheffield Smoothness value. As noted above, the face sheet of the present application is substantially smoother than standard 100% PCW bond paper, even though it is constructed of 100% PCW bond paper. It has been discovered that, by using a smoother paper 100% PCW paper can be used for thermal printing.

The PCW paper layer is specially manufactured to have a high fiber density. Unlike typical PCW paper, the PCW paper that is used in the top layer 102 has a fiber density that allows the thermal coating to sit on the side of the top layer 102 while reducing absorption of the thermal coating within the post-consumer waste paper. More specifically, absorption is reduced as compared with standard PCW paper.

As noted above, the PCW paper layer that forms the top layer 102 may have a a Sheffield smoothness rating that is less than 170 Sheffield units on a felt side of the PCW paper layer and less than 190 Sheffield units at a wire side of the PCW paper layer. The felt side of the paper is the side of the top layer 102 upon which the thermal coating is applied. This side may also be called the face side or top side. The wire side of the paper is the side of the top layer 102 that does not have the thermal coating. This side may also be called the bottom or backer side. In some implementations, the wire side of the paper is the side upon which the adhesive is applied.

The Gurley second or Gurley unit is a unit that describes air permeability as a function of the time required for a specified amount of air to pass through a specified area of a separator under a specified pressure. Notably, the face sheet of the present application has less air permeability, which allows a PCW paper, including 100% PCW paper in some implementations, to be used for thermal printing. The PCW paper layer that forms the top layer 102 may have a Gurley porosity that is greater than 13 seconds per 100 cubic centimeters.

The liner 108 has an external side (i.e., bottom side) opposite the side of the liner that contacts the adhesive. In some embodiments, the label assembly may be provided on a roll, in which case the external side of the liner contacts the top layer of another portion of the roll.

The liner 108 may be a single-layer liner.

In the embodiment of FIGS. 1 and 2, the top layer 102 is butt cut to produce a plurality of butt-cut labels 110. Butt cut labels have no gap between them and have square-corners. In at least some embodiments, the label assembly 100 may be perforated to allow the labels to be separated. More particularly, the liner 108 may be perforated at regions which demarcate the labels. That is, the perforations may separate one label 110 from another.

Figure 3:
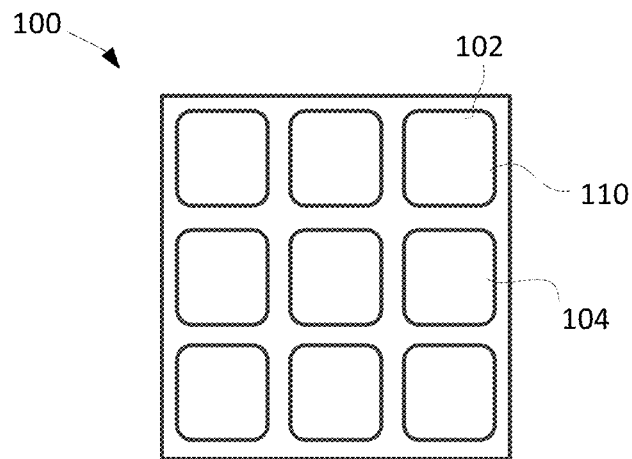
FIG. 3 shows a top view of a die cut label assembly in accordance with example embodiments of the present disclosure.

Referring now to FIG. 3, a top view of an alternate label assembly is illustrated. The label assembly of FIG. 3 has similar construction to that in FIGS. 1 and 2, except that the top layer 102 is die cut instead of being butt cut. Die cut labels 110 may have rounded corners and also have spacing between each label 110. That is, there is a gap separating one label 110 from another. Like the butt cut label assembly, the die cut label assembly may also include perforations separating one label 110 from another. The perforations may be provided midway between the labels (i.e., between midway between ends of each gap separating the labels).

In at least some implementations, the label assembly may be made without a liner 108 in order to make it a linerless construction not requiring die cutting As illustrated in FIGS. 1 to 3, the label assembly 100 may be provided in the form of a flat sheet. The flat sheet may, for example, be configured for insertion within a sheet-feed printer. For example, the flat sheet may be 8.5"×11", or another standard paper size. In such embodiments, the label assembly 100 may include a plurality of labels. In other embodiments, the label assembly 100 may be provided in the form of a roll. For example, the roll of labels may be configured for insertion within a printer that is adapted to receive a roll. For example, the labels may be scale labels that are used in a scale printer, such as a deli scale printer, and may not require the assembly to be die cut A scale printer is a printer that is connected to a scale to allow for customized printing based on the weight measured at the scale.

Figure 4:
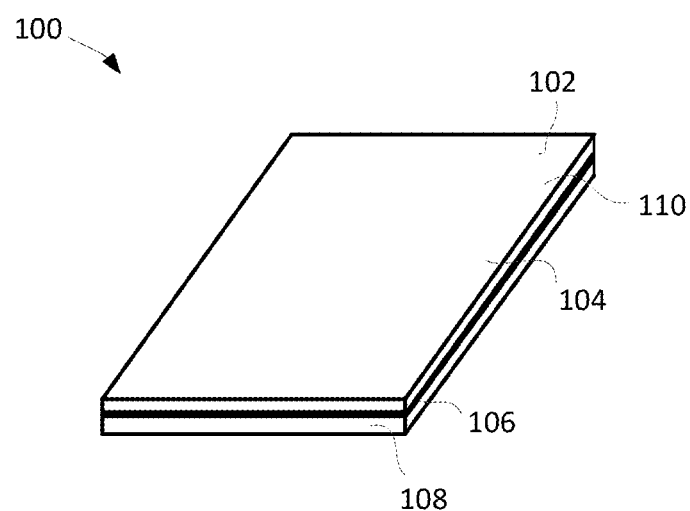
FIG. 4 is a perspective view of a label assembly that includes a single label in accordance with example embodiments of the present disclosure.

Referring now to FIG. 4, in some embodiments, the label assembly may include only a single label. More particularly, a label assembly having a top layer 102 that includes a single label 110 may be provided. The top layer 102 contacts the adhesive as described above and the liner 108 contacts the other side of the adhesive as also described above.

The labels 110 that are described herein may be applied to a package by attaching the label to the body of the package. For example, the label may be applied to a box, plastic wrap, Styrofoam™, deli wrapping paper, etc. More particularly, to apply the label to the package body, the liner 108 is removed from the label 110 to expose the adhesive and the label 110 is applied to the package body using the adhesive. In using the label in this way, a package having a label of the type described herein is provided. For example, the label includes a top layer having a front side and a back side and a permanent adhesive covering the entirety of the back side of the top layer. The label is applied to the package body such that the package body directly contacts the permanent adhesive to sandwich the permanent adhesive between the top layer and the package body.

Notably, traditional recycled papers are not well-suited for manufacturing a label 110 or liner 108 having at least some of the features described herein. As described in the background section above, traditional techniques use paper that has been manufactured to have a finish that prevents liquid from being absorbed into the paper. For example, traditional techniques may use a paper that has a smooth, supercalendered finished surface. Traditional recycled papers are uncoated and are very porous which would not allow a smooth thermal coating to be applied. As we formulated the recycled paper to be denser it allows the thermal coating to remain on the surface.

In some modifications of the above, a primer may be applied to the top layer prior to application of the thermal coating. By way of example, the primer may be a Levia OMNI paper primer aqueous primer. The primer may be applied to the top side of the top layer 102 before the thermal coating is applied so that the primer is beneath the thermal coating. That is, the primer is between the thermal coating and the top layer 102.

A method 500 for manufacturing a label assembly will now be described with reference to FIG. 5, which illustrates a flowchart of the method 500.

In implementations which include a liner, at operation 502, the liner 108 may be formed by coating a paper with silicone. In at least some embodiments, the silicone is applied to a paper and is then cured at an operation 504.

The paper may be of sufficient density to prevent tearing of the liner 108 during removal. In at least some embodiments, the liner is constructed of a paper having a paper density between 30 and 150 grams per square meter.

In other implementations of the method 500, the liner 108 may not be manufactured and may instead, be provided in an already manufactured form on which the silicone has already been added to the paper and cured to form the liner.

The liner 108 may be of a type described above with reference to the FIGS. 1-4.

In yet other implementations of the method 500, no liner 108 may be used. Instead, the label assembly that is manufactured using the method 500 may be a linerless label assembly.

The method 500 may include a step 506 of providing a top layer 102. The top layer 102 may be of a type described above with reference to FIGS. 1 to 4. For example, the top layer 102 may be a post-consumer waste (PCW) paper layer. The PCW paper layer may have a fiber density that allows the thermal coating to sit on (i.e., to remain on or reside upon) the side of the PCW paper layer while reducing absorption of the thermal coating within the PCW paper layer. The PCW paper layer may be an uncoated paper layer. That is, the PCW paper layer may be a paper that is not coated during the manufacture of the paper. The PCW paper layer may be a paper that is not coated prior to any coatings of the method 500 described herein being applied (such as the thermal coating at the step 508 described below or the primer, where a primer is used). The PCW paper layer may have a Sheffield smoothness rating that is less than 170 Sheffield units on a felt side of the PCW paper layer and less than 190 Sheffield units at a wire side of the PCW paper layer. The PCW paper layer may have a Gurley porosity that is greater than 13 seconds per 100 cubic centimeters. The PCW paper layer may include at least 70% PCW.

While not illustrated in FIG. 500, the method 500 may include a step of applying a primer to a side of the top layer 102. The primer may be of a type described above with reference to the FIGS. 1 to 4. The primer may be applied at a top side of the top layer 102. For example, the primer may be applied at a felt side of the top layer 102.

Next, at a step 508, the method includes providing a thermal coating at a side of the top layer 102. The thermal coating may be of a type described above with reference to the method 500 of FIGS. 1 to 4. The thermal coating may be applied at a top side of the top layer 102; for example, the felt side. In implementations in which a primer has been applied to the top layer 102, the thermal coating may be applied to a primed side of the top layer 102.

The thermal coating is applied to a surface of the top layer 102 that is not processed to have a supercalendered surface. The surface upon which the thermal coating is applied may be otherwise uncoated or it may, in implementations in which a primer is used, be coated only with the primer prior to the application of the thermal coating. The top layer 102 may be otherwise uncoated.

Accordingly, the surface that the thermal coating is applied to is non-finished and non-glossy. The side of the paper that the thermal coating is not applied to (i.e. the side that is opposite the side where the thermal coating is applied) may have a glossy finish, or may not have a glossy finish. The thermal coating may or may not require a base coat to improve the thermal imagining.

The thermal coating may be applied to the paper in liquid form; for example, with a roller. In other embodiments, the thermal coating may be sprayed or pumped onto the surface of the paper.

Accordingly, at step 508, a thermal coating is applied to a top of the top layer 102. The thermal coating may be a thermochromic coating which allows the top layer 102 to be printed using a thermal printer. For example, the thermal coating may allow the paper to change color due to a change in temperature.

At operation 510, an adhesive 106 may be applied to the bottom of the top layer 102. The bottom is the side that does not include the thermal coating.

The adhesive 106 may be applied directly to the face sheet of the label 110 or can be applied through a transfer coat applying the adhesive to, for example, the liner 108, and transferring to the top layer 102

The top layer 102 may be of the type described above and the adhesive may also be of the type described above.

Figure 5:
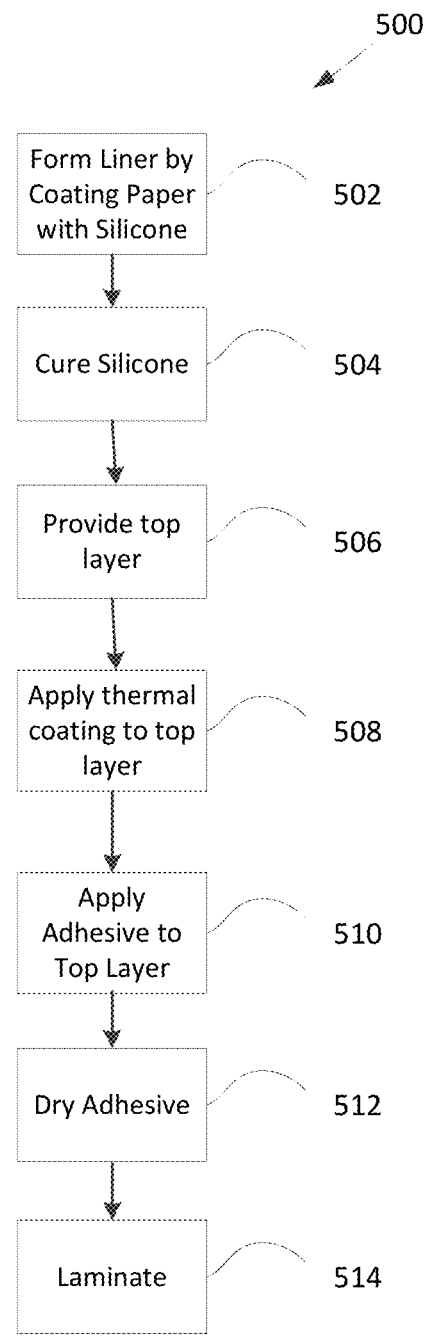
FIG. 5 is a flowchart of a method for manufacturing a label assembly in accordance with example embodiments of the present disclosure.

While FIG. 5 illustrates the application of the adhesive 106 to the top layer 102 as occurring after the paper is coated with silicone (at operation 502), in practice, the ordering of these steps may be different. In some embodiments, these steps may be performed in parallel.

The adhesive may be applied in liquid form and, at operation 512, the top layer 102 and the adhesive 106 are passed through a dryer to remove moisture from the adhesive.

At operation 514, the top layer 102 is laminated to the liner 108. More particularly, the adhesive provided on the top layer 102 is brought into contact with the liner 108, causing the liner 108 to adhere to the top layer using the adhesive. Since the liner 108 has been treated with silicone, it can easily be removed from the top layer and adhesive. The side of the liner 108 that has been coated with silicone is the side that is brought into contact with the adhesive.

In some embodiments, after lamination further operations may be performed to further process the label assembly. For example, the label assembly may be further processed by cutting the top layer into a plurality of regions, each associated with a separate label. The cutting may include die cutting or butt cutting or sheeting. Sheeting produces rectangular labels with square corners that are sheeted individually.

Furthermore, in at least some embodiments, the liner may be perforated to create a plurality of regions, each associated with a separate label.

Furthermore, in some embodiments the thermal face sheet which includes the top layer and the thermal coating may not have a liner at all for a liner less application.

Furthermore, in some embodiments, the thermal face sheet which includes the top layer and the thermal coating may not include an adhesive. That is, the thermal face sheet may be used as thermal paper rather than as a label per se.

Certain adaptations and modifications of the described embodiments can be made. Therefore, the above discussed embodiments are considered to be illustrative and not restrictive.

The invention claimed is:

1. A thermal sheet comprising:
a post-consumer waste (PCW) paper layer; and
a thermal coating applied at a side of the post-consumer waste paper layer, wherein the post-consumer waste paper layer has a fiber density of between 30 and 150 grams per square meter to reduce absorption of the thermal coating within the post-consumer waste paper layer.

2. The thermal sheet of claim 1, wherein the PCW paper layer is an uncoated paper, the uncoated paper being a paper that is not coated during manufacture of the paper.

3. The thermal sheet of claim 2, wherein the PCW layer has a primer at the side of the PCW paper layer and wherein the primer is beneath the thermal coating.

4. The thermal sheet of claim 1, further comprising an adhesive at a side of the PCW paper layer that is opposite the side on which the thermal coating is applied.

5. The thermal sheet of claim 4, further comprising a removable liner contacting the adhesive, the removable liner sandwiching the adhesive between the removable liner and the PCW paper layer.

6. The thermal sheet of claim 1, wherein the PCW paper layer has a Sheffield smoothness rating that is less than 170 Sheffield units on a felt side of the PCW paper layer and less than 190 Sheffield units at a wire side of the PCW paper layer.

7. The thermal sheet of claim 1, wherein the PCW paper layer has a Gurley porosity that is greater than 13 seconds per 100 cubic centimeters.

8. The thermal sheet of claim 1, wherein the PCW paper layer includes at least 70% PCW.

9. The thermal sheet of claim 1, wherein the thermal sheet is a linerless thermal sheet.

10. A method of preparing a thermal sheet, the method comprising:
providing a post-consumer waste (PCW) paper layer; and
applying a thermal coating at a side of the PCW paper layer, wherein the PCW paper layer has a fiber density of between 30 and 150 grams per square meter to reduce absorption of the thermal coating within the post-consumer waste paper layer.

11. The method of claim 10, wherein the PCW paper layer is an uncoated paper, the uncoated paper being a paper that is not coated during manufacture of the paper.

12. The method of claim 11, further comprising, prior to applying the thermal coating, applying a primer at the side of the PCW paper layer.

13. The method of claim 10, further comprising:
applying an adhesive at a side of the PCW paper layer that is opposite the side on which the thermal coating is applied.

14. The method of claim 13, further comprising:
applying a removable liner contacting the adhesive to sandwich the adhesive between the removable liner and the PCW paper layer.

15. The method of claim 10, wherein the PCW paper layer has a Sheffield smoothness rating that is less than 170 Sheffield units on a felt side of the PCW paper layer and less than 190 Sheffield units at a wire side of the PCW paper layer.

16. The method of claim 10, wherein the PCW paper layer has a Gurley porosity that is greater than 13 seconds per 100 cubic centimeters.

17. The method of claim 10, wherein the PCW paper layer includes at least 70% PCW.

18. The method of claim 10, wherein the thermal sheet is a linerless thermal sheet.

* * * * *